Sept. 12, 1967 C. B. FORD 3,340,833
FERTILIZER DISPENSER FOR A DIGGER
Filed Aug. 26, 1964
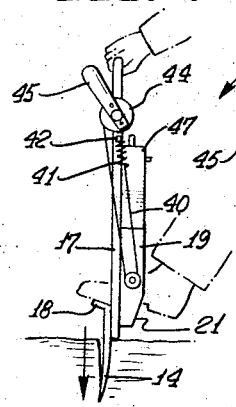
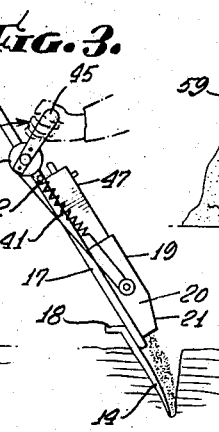
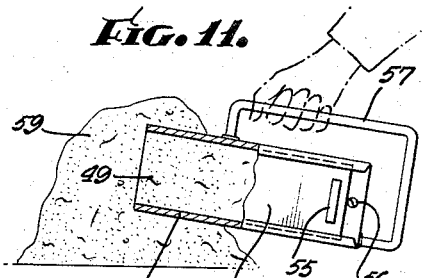
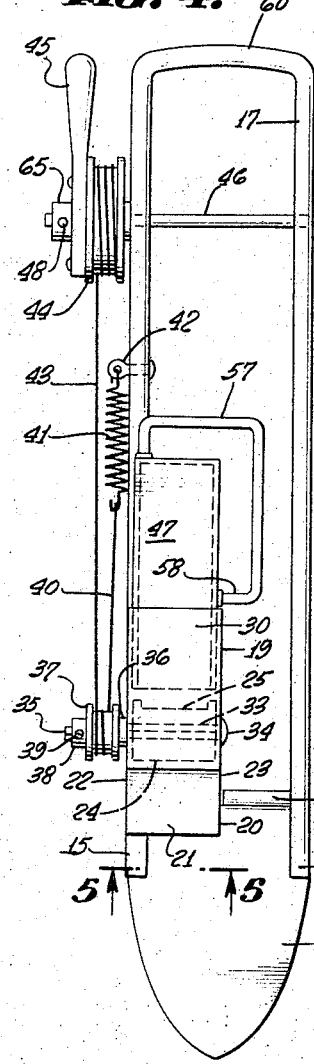
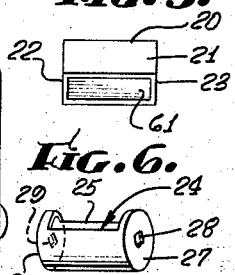
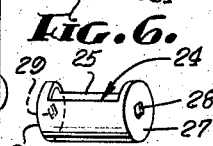
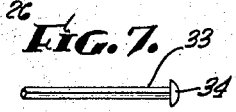
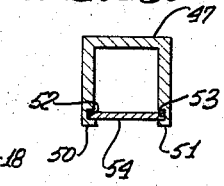
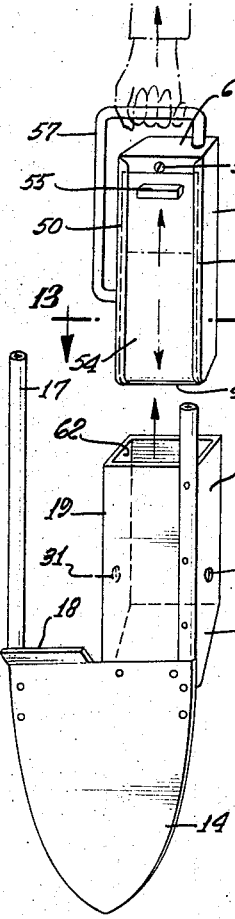
INVENTOR:
Carry B. Ford

United States Patent Office 3,340,833
Patented Sept. 12, 1967

3,340,833
FERTILIZER DISPENSER FOR A DIGGER
Clancy B. Ford, 16901 Schoolcraft St.,
Van Nuys, Calif. 91406
Filed Aug. 26, 1964, Ser. No. 392,104
4 Claims. (Cl. 111—95)

This invention relates to garden tools and more specifically to lawn cultivating tools and is a fertilizer dispenser for a digger which comprises a digger means for making restricted, clean and uniform openings in the top soil, and a container means for carrying substantial quantity of fertilizer, and a dispenser means for dispensing therefrom into the dug openings respectively a proportionally restricted and uniform ration of fertilizer, and a trigger means for actuating and unloading the dispenser means, and means for reloading of the latter.

Heretofore an amateur gardener had a poor choice of either to distribute manually the fertilizer over the top of his lawn soil thereby exposing the fertilizer to easy wash-out by irrigation water, or practically ruin his lawn in fruitless effort to distribute the fertilizer under the top of the soil by using common digging tools for digging inevitably uneven, unsightly and dirty holes with the soil scattered all around and thereafter carrying manually to each hole a merely guessed quantity of fertilizer, which naturally called for excessive, inefficient, uncertain and dirtying effort most likely to result in a messed up lawn, unevenly distributed fertilizer and, thereafter, permanently uneven growth.

A main object of this invention is to provide a single self-contained tool adapted for subterranean fertilization of a lawn, and for easier, cleaner, time saving and better cultivation thereof by successively and neatly breaking up the tightly packed top crust, loosening the soil without scattering it over the top of the lawn, making uniform openings in the soil and dispensing immediately thereafter thereinto uniformly rationed subterranean deposits of fertilizer which are preserved therein and kept from being washed away by irrigation water, and, whereby, the latter and the fertilizer are thus provided with access to deeper and easier penetration into the soil for the nature required promotion of better and more abundant growth.

One of the important objects of this invention is to provide a one unit device with means for making uniform neat and clean holes in the top soil without scattering the latter over the top, and to provide a container means for containing a substantial quantity of fertilizer, and said container having a movable bottom means for holding a ration of fertilizer therein, when dormant, and for dispensing therefrom, when actuated, restricted uniform rations of fertilizer into each hole immediately after it has been made by said device and before the latter is removed from the hole, and means for actuating said movable bottom means to and from said dormant and dispensing positions.

It is also an object of this invention to provide means for easy and clean reloading of the tool with said substantial quantity of fertilizer.

It is further an object of this invention to provide a movable and easily carriable elongated container with an openable bottom and closed top which is convertible into a pitcher and having means for lifting it and carrying it vertically, and means for holding it horizontally and operating it as a pitcher, and means for opening and closing its bottom.

It is an important object of this invention to make a device thereof simple, easy and inexpensive to manufacture, maintain and operate.

To illustrate by an example how the above and other objects of this invention may be practically achieved reference now is being made to the accompanying drawings.
In the drawings:
FIGURE 1 is a plane side view of a device of this invention being used to pierce top soil vertically.
FIGURE 2 is likewise a view of the same device being used to form a V shaped hole in the soil from position shown in FIGURE 1.
FIGURE 3 is a similar view of same device being triggered to dispense therefrom a quantity of fertilizer into the hole referred to in FIGURE 2.
FIGURE 4 is a plane back view of a device of this invention.
FIGURE 5 is a view taken from 5—5 of FIGURE 4.
FIGURE 6 is a perspective view of the fertilizer dispensing component shown here as a rotary cylinder with an upwardly facing open lengthwise slot above the center and showing and indicating rectangular openings through the center of each end wall of the cylinder.
FIGURE 7 is a perspective view of a rectangular axle insertable through the rectangular matching holes of the cylinder indicated in FIGURE 6.
FIGURE 8 is a perspective view of the cylinder shown in FIGURE 6 except here showing its open slot facing downwardly.
FIGURE 9 is a perspective sectional front view of the device shown in FIGURE 4 with some of the components removed, and a removable elongated container with its bottom open in a process of being lifted from its stationary receptacle.
FIGURE 10 is a perspective view of a separated slidable door shown here in two different positions.
FIGURE 11 is a plane and partly cross-sectional side view of the removable container being used separately for reloading it as a pitcher with its bottom open and turned against a pile of fertilizer.
FIGURE 12 is a perspective view of the removable container turned up-side-down and having its open bottom closed by slidable door shown separately in FIGURE 10.
FIGURE 13 is a cross-section view taken at 13—13 of FIGURE 9 and shows the two opposite slots for the slidable door shown separately in FIGURE 10.

In reference to the drawings:
Shovel-like blade 14 (FIGURE 4) is secured with and over end sections 15 and 16 of U-shaped frame 17 and has a foot rest 18. Rectangular receptacle 19 is secured with frame 17 and blade 14, for instance, as indicated in FIGURE 9. The lower end section 20 of receptacle 19 has its outer (front) wall 21 tapered towards blade 14 and, with its likewise tapering side walls 22 and 23 respectively, forms a bottomless funnel-like narrowed open exit 61 (FIGURE 5) from receptacle 19 lengthwise towards and to the lower back face of blade 14. Cylinder 24 (FIGURES 6 and 8) has an elongated open slot 25 beyond the center and end walls 26 and 27 respectively with respective rectangular openings 28 and 29 through the center thereof and is of a diameter very slightly smaller than the inside width of the rectangular upper section 30 of receptacle 19, and of length slightly smaller than the inside distance between the side walls of said section 30. Through the opposite side walls of the latter in the lower part thereof are holes 31 and 32 facing each other and of diameter slightly larger than the diagonal of the rectangle in openings 28 and/or 29. Rectangular axle 33 (FIGURE 7) has a rounded head 34 and is adapted to fit rotatably through holes 32 and 31 in receptacle 19 and to fit tightly and rectangularly matching through openings 28 and 29 of cylinder 24 when the latter is inserted into section 30 of receptacle 19 substantially as indicated in FIGURE 4 where over the protruding end-section 35 of axle 33 is first mounted a loosely fitting washer 36, then a pulley 37 with a rectangular axle matching hole through its center is fit tightly over the rectangular section of axle 33, and, finally, a lock washer 38 with lock screw 39. In the grooved rim of pulley 37 is secured one end of a string 40, the other end thereof is secured with one end of an inwardly resilient coil spring 41, the other end of the latter is fastened to bolt 42 which is secured with and protruding from one leg of frame 17 as shown in FIGURE 4. One end of another string 43 is also secured with the grooved rim of pulley 37, the other end of string 43 is secured with the grooved rim of larger pulley 44 which has a handle 45 secured therewith and is turnably mounted over the protruding end section of axle 46, the latter being secured with fork sections of frame 17 as indicated in FIGURE 4. Lock washer 65 with lock screw 48 are used to keep pulley 44 from sliding sidewise.

When handle 45 is not engaged, the slot 25 of cylinder 24 within receptacle 19 faces upwardly. Thus, when fertilizer is put into receptacle 19 through the open top of the latter said fertilizer will fill cylinder 24 through its slot 25 and will remain therein and in receptacle 19 since the walls of the cylinder 24 and their respective proximity to walls of receptacle 19 form a practically closed bottom.

When handle 45 is turned from the position shown in FIGURE 1 to the position shown in FIGURE 3 the string 43 will turn pulley 37 and thereby cylinder 24 to a position where slot 25 of the latter will face downwardly whereby contents of cylinder 24 will fall therefrom through slot 25 into the funnel-like section 20 of receptacle 19 and will be dispensed downwardly along the back side of blade 14 through the narrowed open end 61 of section 20 of receptacle 19.

When handle 45 is turned a section of string 40 becomes wound over pulley 37 and thereby stretches spring 41 outwardly substantially as indicated in FIGURE 3.

When handle 45 is released, the inward resiliency of spring 41 will cause pulley 37 and the cylinder 24 to turn to the original position via string 40 and will likewise turn pulley 44 and handle 45 via string 43.

Elongated rectangular container 47 (FIGURE 9) has a closed top 66 and an open bottom 49, and is adapted to slide easily in and out of upper section 30 of receptacle 19 through open top 62 of the latter and in substantially close proximity to the inner walls thereof. Opposite edges on one length side and the bottom side of container 47 are provided with opposite ridges 50 and 51 (FIGURES 9 and 13) which form two opposite continuous slots, sectionally elongated and sectionally rounded, 52 and 53 (FIGURE 13) and extending from the top of container 47 downwardly to and roundly around and along the bottom edges thereof substantially as indicated in FIGURE 9, and are adapted for holding and allowing to slide therealong a thin and highly flexible sheet 54 (FIGURE 10) substantially as indicated in FIGURES 9 and 12, said sliding actuated manually by means of the slightly protruding handle 55 secured with front of sheet 54. The slightly protruding head of removable screw 56 is provided to lock slidable sheet 54 within the slots 52 and 53 once inserted thereinto via their respective open ends at the top end of container 47 as indicated in FIGURE 9.

When sheet 54 is pulled against screw 56, the bottom 49 of container 47 is open (FIGURE 9); when sheet 54 is pushed away from screw 56 (as shown in FIGURE 12), said bottom 49 of container 47 becomes closed by a section of sheet 54. Thus sheet 54 serves as a slidable door to container 47.

An L-shaped handle 57 is secured to container 47 as indicated in FIGURES 4, 9, 11 and 12. Protruding end-section 58 of handle 57 (FIGURE 4) is adapted to restrict the extent of suspension of container 47 into receptacle 19 to prevent interference of container 47 with turning of cylinder 24.

The illustrated shape and position of handle 57 apparently allows its use for lifting container 47 vertically from receptacle 19 as indicated in FIGURE 9, and further allows its use for holding container 19 as a pitcher (FIGURE 11) for convenient and cleaner insertion thereof into a pile of fertilizer 59 for efficient and easy reloading of container 19 when its bottom 49 is open. After such reloading said bottom 49 may be closed by slidable sheet 54 via handle 55 as shown in FIGURE 12, and then the container 47 may be safely, neatly and comfortably carried from the, for instance, far-off pile of fertilizer to a remote spot on the lawn where the tool was left without need of bringing the latter to the pile of fertilizer and vice-versa.

While the container 47 remains safely closed it can be held as shown in FIGURE 9 and in such position it can be easily and simply inserted into receptacle 19 as shown in FIGURE 4. Thereafter sheet 54 should be pulled upwardly against screw 56 via handle 55, which operation opens container bottom 49 allowing the fertilizer from container 47 to drop into receptacle 19 and therefrom into cylinder 24 via slot 25. Now the tool is ready for use.

The successive applications of the tool are illustrated in FIGURES 1–3 respectively.

First the tool is lifted and held by a hand placed over horizontal middle section 60 of frame 17. Thus it can be easily carried and placed vertically over a desired spot on the lawn. Then a foot is forcefully applied over and against the foot rest 18 whereby blade 14 is forced to pierce the top crust of the soil and penetrate thereinto as far as protruding ends 15 and 16 of frame 17 will permit (FIGURE 1).

Thereafter the elongation of frame 17 is used as a lever for slanting the tool forwardly by the holding hand as shown in FIGURE 2. Due to the substantial leverage formed by the greater length of frame 17 vs. submerged section of blade 14, the latter will slant with relative ease against the adjacent soil compressing the latter forward at the slanting angle and thereby forming a clean neat V shaped hole in the ground as indicated in FIGURE 2 and without digging out and scattering the soil.

Then, holding the tool in the slanted position, the handle 45 is pulled by the other hand from the position shown in FIGURES 1 and/or 2 to the position shown in FIGURE 3, which will turn cylinder 24 to position where its open slot 25 faces downwardly, which will release the fertilizer contents of the cylinder 24 into the formed hole. Removal of the hand from handle 45 will automatically permit the return (via spring 41) of the cylinder 24 to original position with its slot 25 facing upwardly whereby cylinder 24 will reload itself with a new ration of fertilizer from container 47 and receptacle 19. Then the tool can be lifted from the hole and the operation repeated over another spot on the lawn.

When the entire supply of fertilizer in the tool is used up, the container 47 is lifted from receptacle 19 as shown in FIGURE 9, reloaded as taught in reference to FIGURE 11, closed as shown in reference to FIGURE 12, carried to and inserted back into the tool and thereafter opened for repetitions of the applications of the tool as hereabove has been described.

While the reduction to practice of herein objects of this invention has been exemplified in references to the accompanying drawings, it is fully understood, of course, that wide variety of modifications may be made in structure, shape, form and arrangements of the components and of devices comprising basic principle or principles of this invention without jeopardizing this patent protection, and that the latter is limited only by the scope of the accompanying claims.

I claim as my invention:

1. Fertilizer and like dispensing digger device comprising an elongated frame, a shovel-like blade secured widthwise to the end-section of the frame and protruding lengthwise therefrom, a foot rest connected to said blade having access thereto above the blade, a receptacle for a container having an opening for receiving the latter and being secured above an upper edge of said blade and having a funnel-like section extending downwardly beyond said edge, said section having a funnel-like opening widthwise parallel and substantially adjacent to a section of the blade side, a cylinder having braced end-sides and being rotatably held within the receptacle above its funnel-like section and being parallel to said blade upper edge and of length and diameter adapted for forming a substantially closed bottom above said receptacle section, an open and substantially wide slot lengthwise through the cylinder wall fully above the cylinder axis, means for turning the cylinder to a first position where its slot faces upwardly within the receptacle, means for turning the cylinder to a second position where its slot faces downwardly towards said funnel-like section and opening, a container being removably inserted into the receptacle, stop means for keeping the bottom wall of the container from coming in contact with the cylinder, a substantially wide opening in the bottom wall of said container facing the cylinder when said container is inserted into the receptacle, a door-like means in the container for closing said opening, a handle means for pulling the container from the receptacle and for handling the container pitcher-like when removed from receptacle for reloading fertilizer or the like from a separate bag, box, pile and like.

2. For a digger tool and like having a handle and a blade secured therewith and protruding downwardly therefrom, a fertilizer or the like dispensing device comprising a receptacle for a container having an opening for receiving the latter and being securable with said digger tool handle above an upper edge of said blade and having a funnel-like section adapted for extending downwardly beyond said edge when said receptacle is secured above said edge, said section having a funnel-like opening widthwise, parallel, and substantially adacent to the side of said blade; a cylinder having braced end-sides and being rotatably held within the receptacle above its funnel-like section and being parallel to said blade upper edge when said receptacle is secured thereabove, said cylinder being of length and diameter adapted for forming a substantially closed bottom above said receptacle section; an open and substantially wide slot extending lengthwise through the cylinder wall fully above the cylinder axis; means for turning the cylinder to a first position where its slot faces upwardly within the receptacle; means for turning the cylinder to a second position where its slot faces downwardly towards said funnel-like section and opening; a container being removably inserted into the receptacle; stop means for keeping the bottom wall of the container from coming in contact with the cylinder; a substantially wide opening in the bottom wall of said container facing the cylinder when said container is inserted into the receptacle; a door-like means in the container for closing said opening; a handle means for pulling the container from the receptacle and for handling the container pitcher-like when removed from receptacle for reloading fertilizer or the like from a separate bag, box and like.

3. For a fertilizer or the like dispenser having a container receptacle open for receiving a container, a container for being removably inserted into said receptacle with stop means for limiting the insert of the container to a pre-determined point within the receptacle; a substantially wide opening in the wall of said container facing the dispenser within the receptacle; a door-like means in the container for closing said opening and for opening it from outside when the container is inserted into the receptacle; a handle means for pulling the container from the receptacle and for handling the container pitcher-like when removed from the receptacle for reloading fertilizer or the like from a separate bag, box and like.

4. For a fertilizer or the like dispenser with a sidewise walled receptacle and a walled cylinder being rotatably held between two opposite side walls of said receptacle and having a slot through the cylindrical wall thereof lengthwise, a structural improvement for dis-mounting the components for cleaning and for re-assembling thereafter and comprising means for remotely turning said cylinder to a first position where said slot faces downwardly and for returning the cylinder to a second position where said slot faces upwardly, said means including a first, angularly shaped, hole through middle section of one of the cylinder side walls, a second hole opposite the first through the opposite side wall of the cylinder, a third hole through a predetermined section in one side wall of the receptacle, and, thereopposite, a fourth hole through the opposite side wall of the receptacle, an elongated rod having a cross section shape and being of length adapted to slide tightly through and into said first and second holes for locking rotatablywise said rod with said cylinder, and for sliding easily and rotatably through and in said third and fourth holes, said rod having an extension extending lengthwise beyond the receptacle side wall when inserted through and sectionally remaining in said holes; a pulley removably mounted over the rod extension beyond the receptacle side wall; a lock screw for locking said pulley with said rod; a string wound over the pulley with two ends loose and extended therefrom to remote points wherefrom they are subject for being pulled alternately whereby the cylinder may be remotely turned to said first position and returned to said second position; and the dismounting of the components for cleaning is accomplished by unscrewing the lock screw and by pulling the rod out of the holes.

References Cited

UNITED STATES PATENTS

| 89,742 | 5/1869 | Doddridge et al. | 111—95 |
| 2,718,856 | 9/1955 | Gathercoal | 111—95 X |

FOREIGN PATENTS

| 981,044 | 5/1951 | France. |
| 281,944 | 7/1952 | Switzerland. |

ABRAHAM G. STONE, *Primary Examiner.*

J. R. OAKS, *Assistant Examiner.*